United States Patent [19]

Shiraishi et al.

[11] Patent Number: 4,924,566

[45] Date of Patent: May 15, 1990

[54] METHOD FOR MANUFACTURING A REINFORCING ELEMENT FOR ASBESTOS FREE FRICTION MATERIAL

[75] Inventors: Hideo Shiraishi, Saitama; Tsutomu Morita, Oota, both of Japan

[73] Assignee: Akebono Brake Industry Co., Ltd., Tokyo, Japan

[21] Appl. No.: 376,180

[22] Filed: Jul. 7, 1989

Related U.S. Application Data

[63] Continuation of Ser. No. 132,241, Dec. 14, 1987, abandoned.

[30] Foreign Application Priority Data

Jan. 8, 1987 [JP] Japan .................................... 62-2545

[51] Int. Cl.$^5$ ...................... F16D 69/00; B32B 17/04; D02G 1/16; D02G 3/40
[52] U.S. Cl. ........................................ 28/143; 28/140; 28/271; 57/6; 57/297; 57/350; 156/180; 188/251 A; 192/107 M; 428/65; 428/375

[58] Field of Search ............. 57/3, 6, 90, 91, 295–297, 57/350; 28/271–276, 103, 140, 143, 167; 156/166, 180, 296, 169, 172; 428/64, 65, 375; 192/107 M; 188/251 R, 251 A

[56] References Cited

U.S. PATENT DOCUMENTS

| | | | |
|---|---|---|---|
| 3,253,396 | 5/1966 | Fish, Sr. | 57/91 X |
| 3,262,177 | 7/1966 | Cobb et al. | 57/91 X |
| 4,058,968 | 11/1977 | Benson | 57/6 X |
| 4,118,528 | 10/1978 | Lowry | 428/65 |

*Primary Examiner*—John Petrakes
*Attorney, Agent, or Firm*—Armstrong, Nikaido, Marmelstein, Kubovcik & Murray

[57] ABSTRACT

Disclosed is a method for making a reinforcing element for use in asbestos-free friction materials. According to the method, heterogenous strands are joined together, without twisting them, and subjected to a fluid jet and to a rubber compounding material. At least one of the strands is fed to the multiplying stage at an overfeed rate.

2 Claims, No Drawings

METHOD FOR MANUFACTURING A REINFORCING ELEMENT FOR ASBESTOS FREE FRICTION MATERIAL

This application is a continuation application of Ser. No. 132,241 filed on Dec. 14, 1987 and now abandoned.

BACKGROUND OF THE INVENTION

The present invention relates to a method of manufacturing a reinforcing element used for asbestos free friction materials for brakes, clutches, etc, and provides particularly the method permitting said reinforcing element to be manufactured with excellent performance and stabilized quality and in low cost.

Conventionally, the woven friction materials have been manufactured generally in such a way that the asbestos is used as a reinforcing element. Thermosetting resin such as phenol resin, rubber compounding material, etc, are adhered to said element and, after preforming, it is heated under pressure in a metal mold for thermoforming.

Recently, because of the environmental problem against the human body, the demand for asbestos free friction materials has increased. For manufacturing the reinforcing element for these asbestos free friction materials, glass fibers are used generally as main components and, to the twisted yarn of said glass fibers with organic fibers, inorganic fibers, metallic fibers or the like, thermosetting resin, rubber compounding material, etc. are adhered. After preforming, it is heated under pressure in a metal mold for thermoforming similarly to above.

However, in order to make the frictional performance of the friction materials using artificial fibers such as said glass fibers etc. for a reinforcing element which is equal to or better than those having friction material using asbestos for the reinforcing element, it is necessary to adhere more rubber compounding material to the reinforcing element in more stabilized state and still the dispersibility of fibers should also be better than in the case of asbestos as a reinforcing element.

Therefore, for the adherence of more amounts of rubber compounding material etc. to the twisted yarn of glass fibers etc., a method has been adopted traditionally that the glass fibers are submitted to the bulking treatment, or that the twisted yarns with other fibers low in the bulk density are used.

In the form of twisted yarns as described above, however, the following inconveniences occur because of the twisting of heterogeneous yarns with same length.

(1) Due to the twisting tension, the degree of bulkiness of bulky roving is lowered.
(2) By twisting, the degree of bulkiness is lowered resulting in a decrease in the dispersibility of fibers after forming.
(3) When adhering and permeating resin, rubber compounding material, etc. to the twisted yarn, the degree of bulkiness is lowered due to the tension acting on the twisted yarn.
(4) Due to the fluctuation of tension acting on the twisted yarn, the degree of bulkiness fluctuates.

Consequently, when using the twisted yarns as described above, the adhering rate of rubber compounding material etc. is lowered, the fluctuation of adhering rate becomes high, further the dispersibility of fibers is lowered, and the fluctuation of dispersibility becomes high resulting in the difficulty in obtaining the stabilized frictional performance after forming of the friction materials, which effects pose the problems.

SUMMARY OF THE INVENTION

As a result of the extensive investigations in view of this situation, a manufacturing method has been developed by the inventors, wherein the foregoing inconveniences are resolved at the same time and further the cost can be reduced by omitting the twisting process. Namely, the invention is characterized in that, in the method of manufacturing multiplied yarn containing no asbestos, which comprises heterogeneous yarns and which is used as a reinforcing element for friction materials, multiplying treatment without twisting is given simultaneously with bulking treatment by allowing said heterogeneous yarns to have a difference in respective feed velocities to make the overfeed rate (the rate of increase in the velocity of yarn fast in feed velocity to the velocity of yarn slow in feed velocity) 0.1 to 20% and by applying a fluid jet.

DETAILED DESCRIPTION OF THE INVENTION

The reason why a difference of velocity is 0.1 to 20% in the overfeed rate is provided for the feed velocity of fibers is due to that, by feeding the fibers fast, which necessitate the bulkiness affecting on the extents of the adherence and the permeation of rubber compounding material, an appropriate and constant degree of bulkiness is given. If the overfeed rate is under 0.1%, there are no effects to obtain effective bulkiness and untwistability, and, with the overfeed rate exceeding 20%, the adherence of rubber compounding material becomes low inversely in amount and also unstable resulting in the incapability of obtaining effective bulkiness and untwistability. Further, the reason why the fluid jet is applied for multiplying the fibers which are different in the feed velocity to make untwisted multiplied yarn simultaneously with bulking treatment is because of that, if twisting, the degree of bulkiness is lowered leading to the poor dispersibility of fibers after forming of the friction material.

EXAMPLE

According to the method of the invention, stranded glass fibers were fed fast at the overfeed rate as shown in Table 1, and these were combined with other fibers and entangled with each other by blowing the compressed air to prepare the samples of untwisted multiplied yarn. Moreover, for comparison, twisted yarns were manufactured according to the conventional method by twisting glass bulky roving with other fibers having same length at a twisting 30 times by every meter as shown in Table 1.

TABLE 1

| Divi-sion | Type of fiber | (Number of yarns) | | | | | | | | |
|---|---|---|---|---|---|---|---|---|---|---|
| | | Example of the invention | | | | | | Conventional example | | |
| | | 1 | 2 | 3 | 4 | 5 | 6 | 7 | 8 | 9 |
| A | Glass strand (1200 Tex) | 1 | 1 | 1 | 1 | 1 | 1 | — | — | — |

TABLE 1-continued

| Divi-sion | Type of fiber | (Number of yarns) | | | | | | | | |
|---|---|---|---|---|---|---|---|---|---|---|
| | | Example of the invention | | | | | | Conventional example | | |
| | | 1 | 2 | 3 | 4 | 5 | 6 | 7 | 8 | 9 |
| B | Glass bulky roving (600 Tex) | — | — | — | — | — | — | 2 | 2 | 2 |
| | Super polynosic (1000 De) | 1 | 1 | 1 | 1 | — | — | 1 | 1 | — |
| | Aramide fiber (Cornex) (1000 De) | — | — | — | — | 1 | — | — | — | 1 |
| | Glass strand (67 Tex) | — | — | — | — | — | 1 | — | — | — |
| | Brass wire (diameter: 0.15 mm) | 1 | 1 | 1 | — | 1 | 1 | 1 | — | 1 |
| | Overfeed rate (%) | 3 | 6 | 10 | 6 | 6 | 6 | — | — | — |

Using untwisted multiplied yarns and twisted yarns made up in this way, first, the amount of rubber compounding material adhered was examined as follows: The rubber compounding material was allowed to adhere to each yarn and the numerical values of parts by weight of adhered rubber compounding material to 100 parts by weight of yarn when applied X (g), 2X (g) and 4X (g) of tension to respective yarns were determined for ten yarns each under respective conditions. These results are shown in Table 2 making the average value x and the range R between maximum value and minimum value. Secondly, as the examination of the dispersibility of fibers, the amount of rubber compounding material adhered to each yarn was made identical and, after forming, the dispersibility of glass fibers was expressed by the magnitude of the diameter of yarn when that of conventional example No. 7 was put as 1.0. Results are shown in Table 3.

TABLE 2

| Tension (g) | Item | Example of the invention | | | | | | Conventional example | | |
|---|---|---|---|---|---|---|---|---|---|---|
| | | No. 1 | No. 2 | No. 3 | No. 4 | No. 5 | No. 6 | No. 7 | No. 8 | No. 9 |
| X | $\chi$ | 150 | 170 | 200 | 180 | 170 | 160 | 100 | 105 | 100 |
| | R | 145-155 | 165-175 | 195-210 | 175-185 | 165-175 | 155-165 | 75-120 | 80-120 | 75-120 |
| 2X | $\chi$ | — | 165 | — | — | 170 | 160 | 80 | 85 | 80 |
| | R | — | 160-170 | — | — | 165-175 | 155-165 | 65-100 | 70-105 | 65-100 |
| 4X | $\chi$ | — | 160 | — | — | 165 | 155 | 60 | 65 | 65 |
| | R | — | 155-165 | — | — | 160-170 | 150-160 | 50-70 | 55-70 | 55-70 |

TABLE 3

| No. | Example of the invention | | | | | | Conventional example | | |
|---|---|---|---|---|---|---|---|---|---|
| | 1 | 2 | 3 | 4 | 5 | 6 | 7 | 8 | 9 |
| Diameter of yarn (mm) | 2.0 | 2.5 | 3.0 | 2.7 | 2.6 | 2.5 | 1.0 | 1.1 | 1.0 |

In Table 2, all of the untwisted multiplied yarns of the examples of the invention indicate high amount of adherence of rubber compounding material compared with the twisted yarns according to the conventional examples, and further, this amount of adherence becomes higher as the overfeed rate increases. Moreover, in the examples of the invention, the fluctuation of the amount of adherence is also small, and the lowering in the amount of adherence is less even when the tension becomes large. Therefore, in accordance with the method of the invention, it is understood that the multiplied yarns extremely low in lowering of the degree of bulkiness and the fluctuation of the amount of adherence of rubber compounding material can be obtained even when the tension acting on the yarn changes significantly.

Moreover, from Table 3, it can be seen that, in accordance with the method of the invention, the diameter of yarn is magnified markedly compared with that of conventional examples showing the dispersibility of fibers after forming being improved drastically.

As described above, if utilizing the reinforcing element for friction materials according to the invention, the performance of the friction materials can be stabilized without using of asbestos and further drastic cost reduction is possible since the twisting process can be abolished. Therefore, the invention exerts remarkable effect in the industry.

What is claimed is:

1. A method of making asbestos free friction materials, comprising the steps of,
   multiplying heterogenous strands to be used as a reinforcing element without twisting them, and simultaneously,
   subjecting the resulting heterogenous yarns to a fluid jet to bulk said yarns, with at least one of said yarns being fed to the jet at an overfeed rate,
   adhering a rubber compound material to said heterogenous yarns, and
   forming the heterogenous yarns into an asbestos free friction material.

2. The method of manufacturing a reinforcing element for asbestos free friction materials according to claim 1, wherein the majority of said heterogeneous yarns used for the reinforcing element are glass fibers and multiplying is made by combining them with one or more kinds of organic fibers, inorganic fibers and metallic fibers.

* * * * *